United States Patent [19]
Westberg

[11] 3,794,361
[45] Feb. 26, 1974

[54] PIPE COUPLINGS

[75] Inventor: Alvar Torsten Westberg, Sandviken, Sweden

[73] Assignee: Sandvik Aktiebolag, Sandviken, Sweden

[22] Filed: Oct. 4, 1971

[21] Appl. No.: 186,153

[30] Foreign Application Priority Data
Oct. 13, 1970   Sweden............................ 13814/70

[52] U.S. Cl................................. 285/336, 285/367
[51] Int. Cl............................................. F16l 23/00
[58] Field of Search .... 285/336, 367, 410; 277/236, 277/170, 171, 172

[56] References Cited
UNITED STATES PATENTS
| | | | |
|---|---|---|---|
| 2,926,937 | 3/1960 | Parsons............................... | 285/350 |
| 1,873,855 | 8/1932 | Wilson................................ | 285/336 |
| 3,208,758 | 9/1965 | Carlson............................ | 285/336 X |
| 2,878,041 | 3/1959 | Hobbs................................. | 285/367 |

FOREIGN PATENTS OR APPLICATIONS
| | | | |
|---|---|---|---|
| 454,048 | 4/1913 | France................................. | 285/336 |
| 343,781 | 2/1931 | Great Britain....................... | 285/336 |

*Primary Examiner*—Andrew V. Kundrat
*Attorney, Agent, or Firm*—Pierce, Scheffler and Parker

[57] ABSTRACT

The pipe coupling of the invention is characterized in that the channel, formed by opposed grooves provided on opposed faces of flanges on the ends of two pieces of pipe to be coupled, is composed of at least one essentially triangular groove in the contact face of each of the flanges; in addition, the channel has at least one radially directed groove whose cross-sectional area is essentially rectangular or trapezoidal. The groove is so shaped that at least one edge directed towards the sealing ring is formed between the last-mentioned groove and the other part of the channel.

2 Claims, 8 Drawing Figures

PATENTED FEB 26 1974  3,794,361
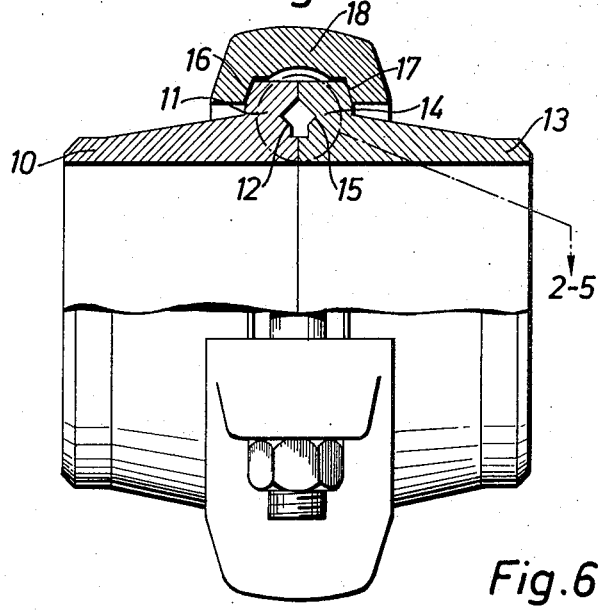
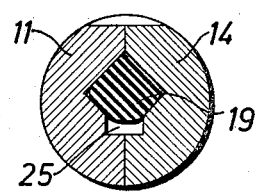
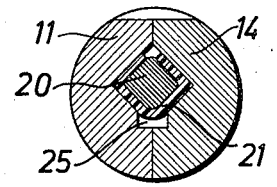
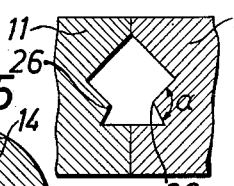
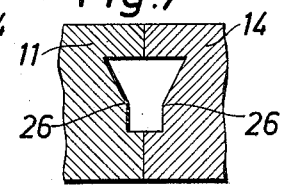
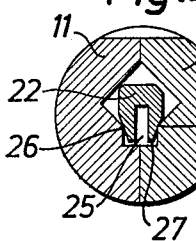
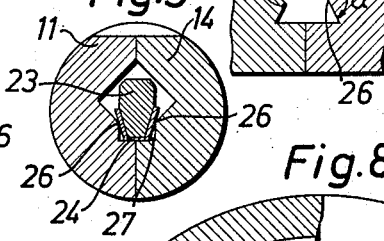
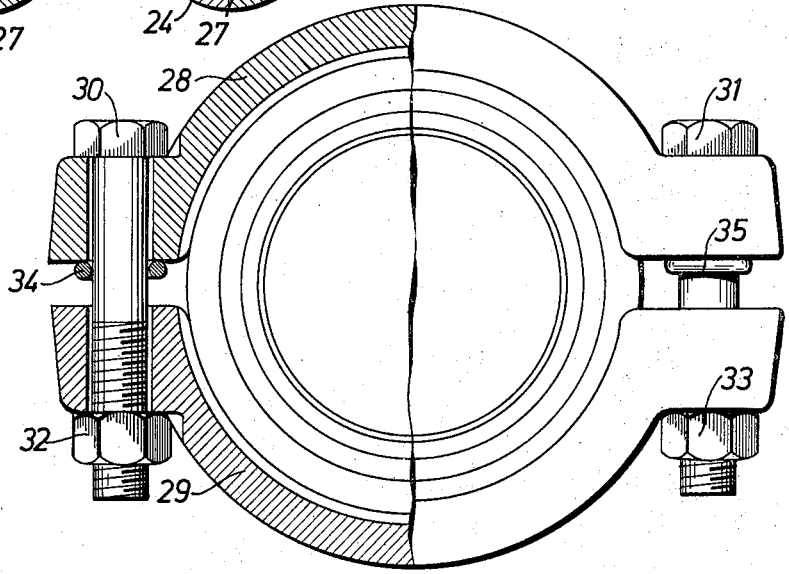

PIPE COUPLINGS

The present invention relates to pipe joints of the type wherein the pipe ends have opposed flanges held together by means of a surrounding clamping ring or equivalent means. The adjacent faces of the flanges have annular opposed grooves forming a channel for accommodating a sealing ring.

The sealing ring according to the invention has a cross-sectional area which is at the most as large as the cross-sectional area of the channel thereby preventing the ring from protruding from between the flanges. This, in turn, means that the opposed planes of the flanges can be completely drawn together making a rigid joint. The sealing ring and the cross-section of the channel have different geometric shapes, so that a contact pressure arises when the flanges are pressed together.

Heretofore the channel which is formed by the grooves in the opposed flanges has generally had either a circular cross-section (in which case the sealing ring had a square cross-section) or square cross-section (in which case the sealing ring had a circular cross-section). Other types of channels with usually triangular or rectangular grooves are also known. These mentioned kinds of slots are designed individually for a certain kind of sealing ring suitable for special use or temperature range.

The present invention relates to a design of the channel which permits greater flexibility in choosing the sealing ring. This gives primarily a broadening of the temperature range in which the same pipe-coupling can be used in meeting great requirements as to tightness and mechanical strength.

The coupling according to the invention is characterized in that the channel is composed of one or more essentially triangular grooves in the contact faces of the flanges. In addition, the channel has at least one radially extending groove whose cross-sectional area is essentially rectangular, trapezoidal or the like. The groove is so shaped that at least one edge, directed towards the sealing ring, is formed between the last-mentioned groove and the other part of the channel. The boundary of the groove, situated next to the center of the pipe, is usually parallel with the longitudinal direction of the pipe. The mentioned groove is in this case situated on the inner side of the channel, i.e., the part of the channel next to the center of the tube or the coupling. In addition, the groove shall not reach or debouch into the wall of the tube, because its usually cylindrical bottom face makes a necessary guiding edge for sealing rings according to certain embodiments.

The invention will now be described in greater particularity in the following specification, taken with the appended drawing, in which:

FIG. 1 is a longitudinal section of a part of a coupling according to the invention;

FIGS. 2-5 are enlarged details of the coupling shown in FIG. 1 having different embodiments of sealing rings accommodated;

FIGS. 6-7, similarly show other embodiments of channels in the coupling; and

FIG. 8 is a cross-section of the clamping ring holding the pipe joint together.

In FIG. 1 there is shown a coupling in which the tube 10 has a flange 11 with an annular goove 12, and the tube 13 in the same way has a flange 14 with annular groove 15. The grooves lie alongside each other and together form a channel around the flanges. The back faces 16 and 17 of the flanges 11 and 14 are inclined so that they diverge inwardly. They are surrounded by a two-part ring 18, having an inwardly U-formed profile, which is screwed together in order to clamp the flanges 11 and 14 together.

FIGS. 2-5 show the channel in an enlarged scale and accommodating different embodiments of sealing rings. The sealing ring 19 shown in FIG. 2 consists of an elastomer as for instance nitrile rubber. This type of seal can be used at temperatures up to about 100° C. The sealing ring shown in FIG. 3 is also of elastic material, in this case plastics, and consists of a core 20 of, for instance, viton (addition of polymer of perfluoropropylene and vinylidenfluoride) and a cladding 21 suitably of teflon (polytetrafluorethylene). By this design the material properties of the core and of the cladding can be differentiated so that the core has high elasticity while the cladding has high resistance to acids. A sealing ring according to the last-mentioned embodiment can be used at temperatures up to 150° C. and preferably in connection with strongly corrosive media like acids.

In FIG. 4 there is shown another, in itself known, type of sealing ring 22. It may consist of acid-resistant steel with a surface coating of teflon and is then suitable for use in connection with acids at temperatures up to about 250° C.

In FIG. 5 there is shown an additional embodiment of sealing ring consisting of a body 23 of, for instance, acid-resistant steel supplied with a plate 24 of a softer metal as for instance Ag, Cu or Al. Such a sealing can preferably be used under corrosive circumstances at temperatures up to about 350°–400° C.

The channel shown in FIGS. 1-3 is supplied with a rectangular groove 25 which is of an essential importance for the function of the sealing. In the elastomer sealings shown in FIGS. 2 and 3 the groove 25 provides a space in which these sealing rings may expand at high temperatures. In the seals shown in FIGS. 4 and 5 the groove 25 principally serves other purposes. The edge 26 which is formed by the intersection between the triangular grooves in the flange faces and the last-mentioned groove 25, is of great importance. By directing these grooves to form a certain angle directed towards the sealing ring, there will be obtained a "cutting edge" which penetrates into the soft coatings of the sealing rings whereby good sealing is secured. The groove 25 is limited inwardly toward the center of the coupling by the cylindrical bottom face 27, which forms a guiding edge for the sealing rings. In order to get a satisfactory sealing and accommodation in the channel, the rings have a slight conical section in their lower parts.

In FIGS. 6 and 7 there are shown two other embodiments of channels. In the channel shown in FIG. 6 the edge or the knee 26 is formed with a more acute angle than in the other embodiments, thus making increased penetration possible. It has often been found advantageous if the acute angle δ is smaller than 150° and preferably 110°. In all embodiments the edge 26 may preferably be somewhat rounded.

The clamping ring shown in FIG. 8 consists of two clamps 28 and 29, held together by two screws 30 and 31 with nuts 32 and 33. In order to facilitate mounting, the screws are kept on spot in the one clamp by means of the locking rings 34 and 35.

As has been mentioned earlier, the sealing ring according to the invention has a cross-sectional area of the channel. If has been found advantageous if the area of the sealing ring is between 85 percent and 95 percent of the channel area. These data relate preferably to the elastomer sealings, two embodiments of which have been shown in FIGS. 2 and 3.

I claim:

1. In a pipe joint comprising opposed flanges (11, 14) on the pipe ends (10, 13), the adjacent faces of which flanges have annular opposed grooves (12, 15) forming a closed channel when joining the pipes together, said channel accommodating a sealing ring, the improved construction wherein the cross-sectional area of the sealing ring is at the most as large as the cross-sectional area of the channel as defined by the opposed grooves, and said channel is composed of one portion of essentially triangular cross-section and one radially directed portion extending therefrom and whose cross-section is essentially rectangular, said radially directed portion having radially extending walls extending from the terminal end of said portion of essentially triangular cross-section and with said portion of essentially rectangular cross-section having a smaller extension in the axial direction of the pipe than the remaining part of the channel and forming with the other portion at least one edge (26) directed toward the sealing ring.

2. The pipe joint defined in claim 1, wherein said sealing ring is composed of a body of acid-resistant steel with a covering layer of a material penetratable by said edges when said flanges are drawn together.

* * * * *